US012747161B2

(12) United States Patent
Yoo et al.

(10) Patent No.: US 12,747,161 B2
(45) Date of Patent: Sep. 29, 2026

(54) METHOD OF PREPARING HIGH-CONCENTRATION COLLOIDAL SILICA

(71) Applicant: KOREA INSTITUTE OF SCIENCE AND TECHNOLOGY, Seoul (KR)

(72) Inventors: Bok Ryul Yoo, Seoul (KR); Dae Jin Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 638 days.

(21) Appl. No.: 18/198,932

(22) Filed: May 18, 2023

(65) Prior Publication Data

US 2023/0382743 A1 Nov. 30, 2023

(30) Foreign Application Priority Data

May 26, 2022 (KR) ........................ 10-2022-0064598

(51) Int. Cl.
*C01B 33/141* (2006.01)

(52) U.S. Cl.
CPC ........ *C01B 33/141* (2013.01); *C01P 2004/04* (2013.01); *C01P 2004/62* (2013.01); *C01P 2004/64* (2013.01)

(58) Field of Classification Search
CPC ... C01B 33/141; C01B 33/146; C01B 33/148; C01P 2004/04; C01P 2004/62; C01P 2004/64
See application file for complete search history.

(56) References Cited

U.S. PATENT DOCUMENTS

| | | | | |
|---|---|---|---|---|
| 9,550,683 B2 | 1/2017 | Higuchi | | |
| 2017/0075242 A1* | 3/2017 | Sakai | .................. | G03G 9/0902 |
| 2019/0345036 A1* | 11/2019 | Komatsu | ............... | B01F 23/231 |
| 2022/0144650 A1* | 5/2022 | Fujimura | .............. | C01B 33/145 |

FOREIGN PATENT DOCUMENTS

| | | | |
|---|---|---|---|
| CN | 112978735 A * | 6/2021 | ........... C09K 3/1472 |
| JP | 2014-198649 A | 10/2014 | |
| KR | 10-2011-0014486 A | 2/2011 | |
| KR | 10-1916905 B1 | 1/2019 | |
| KR | 10-2021-0133285 A | 11/2021 | |
| KR | 10-2022-0028435 A | 3/2022 | |

OTHER PUBLICATIONS

English machine translation of CN112978735A (2022).*
Written Opinion of The International Searching Authority issued Aug. 17, 2023, in counterpart International Patent Application No. PCT/KR2023/006469 (3 pages in English, 4 pages in Korean).
Stöber, Werner, et al. "Controlled growth of monodisperse silica spheres in the micron size range." *Journal of colloid and interface science* vol. 26. Issue 1 (1968). pp 62-69.
Kickelbick, Guido. "Nanoparticles and composites." *The Sol-Gel Handbook* (2015). pp. 225-244.

* cited by examiner

*Primary Examiner* — Richard M Rump
(74) *Attorney, Agent, or Firm* — NSIP Law

(57) ABSTRACT

Disclosed is a method of preparing colloidal silica, more particularly a method of producing high-concentration (10-55 wt %) colloidal silica by reacting water with a tetraalkyl orthosilicate (TMOS), tetraethyl orthosilicate (TEOS) based silane precursor as a starting material in the presence of a basic catalyst.

24 Claims, 7 Drawing Sheets

METHOD OF PREPARING HIGH-CONCENTRATION COLLOIDAL SILICA

CROSS-REFERENCE TO RELATED APPLICATION

This application claims under 35 U.S.C. § 119(a) the benefit of priority from Korean Patent Application No. 10-2022-0064598, filed on May 26, 2022, the entire contents of which are incorporated herein by reference.

BACKGROUND

(a) Technical Field

The present disclosure relates to a method of preparing colloidal silica, and more particularly to a method of preparing high-concentration colloidal silica from an unhydrolyzed tetraalkyl orthosilicate (TMOS), tetraethyl orthosilicate (TEOS) based silane precursor.

(b) Background Art

Silica particles are widely used in various applications, such as fillers in inorganic and organic polymer composites, packing agents for liquid chromatography columns, chemical mechanical polishing (CMP) agents, hard coating agents, and the like.

Silica is typically spherical in shape and exists as a colloidal state in water.

Silica is prepared through hydrolysis and condensation of a tetrachlorosilane ($SiCl_4$) or tetraalkyl orthosilicate (TMOS), tetraethyl orthosilicate (TEOS) based precursor in water.

Specifically, the reaction of tetrachlorosilane ($SiCl_4$) with water is very fast, so a large amount of silica may be obtained in a short time. However, there are disadvantages in that it is difficult to control the size and shape of silica particles and in that hydrochloric acid (HCl) is generated as a byproduct. Also, the Stober method [J. Colloidal Interface. Sci. 1968, 26(1) 62-69], which is a currently useful method of preparing a colloidal solution of spherical silica, enables the production of colloidal silica by heating a mixed solution of a solvent such as alcohol (especially ethanol) or a mixture thereof, water, and a basic catalyst (ammonia water) from room temperature to 70° C. and then adding TEOS thereto (*Guido Kickelbick.* "7. Nanoparticles and Composites", In David Levy, Marco Zayat "The Sol-Gel Handbook: Synthesis, Characterization, and Applications" Volume 3 (2015) 227-244). Although this method is a very simple method capable of forming spherical colloidal silica having a size of 50 nm to 2000 nm depending on reaction conditions, the concentration of the colloidal silica thus obtained is very low. In order to increase the concentration thereof, a concentration distillation process or a process of redispersing a powder thereof is performed. However, in the concentration process, a coating film may be formed due to attachment of silica to the wall of the reactor, or silica may not be dispersed during the redispersion process, resulting in loss of silica, and the monodispersity of particles may be lowered, making it difficult to increase the value of the product and ensure market competitiveness. Here, when comparing TMOS, which is an alkoxysilane-based precursor similar to TEOS, TMOS has a faster hydrolysis rate, and the $SiO_2$ conversion yield thereof per unit weight of precursor is 39.5%, which is higher than 28.8% of TEOS. Hence, in theory, TMOS is a more favorable precursor for silica preparation than TEOS. Moreover, when recycling the ethanol byproduct resulting from the TEOS reaction, an azeotropic mixture of ethanol and water (water/ethanol=4.5/95.5 at 78.1° C.) is formed, making it difficult to obtain pure ethanol. On the other hand, the methanol byproduct is easy to recover and recycle because high concentration and high purity are easily realized through distillation and concentration from water. Despite such theoretical advantages, the use of TMOS precursors for monodisperse spherical silica in the preparation of silica is limited due to difficulties in controlling the monodispersity of particles and the size thereof.

U.S. Pat. No. 9,550,683 (hereinafter, Patent Literature) proposes a method of using a TMOS precursor in order to overcome the disadvantages of the method of preparing silica using a TEOS precursor. In this patent document, TMOS is supplied to distilled water to obtain a hydrolysate, which is then added dropwise to a low-concentration basic aqueous solution at 100° C. to prepare low-concentration silica, followed by distillation and concentration, thereby yielding 10-20 wt % colloidal silica. In this patent document, since colloidal silica is prepared using a hydrolysate obtained by hydrolyzing TMOS as a starting material, the concentration process must be performed. During the concentration process, aggregation of nano-silica particles may occur, and preparation processing costs may be increased, which is undesirable.

In order to solve such problems, there is developed a method of directly synthesizing (preparing) high-concentration colloidal silica from a tetraalkyl orthosilicate [$Si(OR)_4$, R=methyl(TMOS), ethyl(TEOS)] stock solution, which is an alkoxysilane precursor in water (a reactant and a solvent).

SUMMARY OF THE DISCLOSURE

An object of the present disclosure is to provide a method of producing a colloidal solution of 10-55 wt % spherical silica by directly reacting a basic aqueous solution and a stock solution of TMOS or TEOS as an alkoxysilane precursor with water. Here, the basic aqueous solution is a solution obtained by dissolving a basic catalyst in distilled water.

The objects of the present disclosure are not limited to the foregoing. The objects of the present disclosure will be able to be clearly understood through the following description and to be realized by the means described in the claims and combinations thereof.

The colloidal silica preparation process of the present disclosure is a method of preparing a colloidal solution of high-concentration monodisperse silica in a manner in which an alkoxysilane precursor TMOS or TEOS and a basic aqueous solution are simultaneously placed in a reactor and reacted at a pH of 6 to 11.

In distilled water, the alkoxysilane precursor is hydrolyzed to produce acidic silanol (Si—OH). This low-concentration silanol is acidic, having a pH as low as 4.4. Therefore, reaction at a pH of 7 to 11 using a basic catalyst is advantageous for the preparation of a colloidal solution of monodisperse silica particles.

Unless otherwise stated, the alkoxysilane precursor herein is TMOS and/or TEOS.

The method of preparing colloidal silica according to an embodiment of the present disclosure may include preparing a low-concentration first basic solution (B1) by dissolving a basic catalyst represented by the following [Chemical Formula 1], [Chemical Formula 2], or [Chemical Formula 3] in distilled water, preparing a second basic solution (B2) by dissolving a basic catalyst represented by the following [Chemical Formula 1], [Chemical Formula 2], or [Chemical Formula 3] in distilled water, preparing reactants by providing an alkoxysilane or in combination of the alkoxysilane with the second basic aqueous solution (B2) to the first basic aqueous solution (B1), wherein the alkoxysilane may include tetramethyl orthosilicate (TMOS) or tetraethyl orthosilicate (TEOS), preparing a first colloidal silica ($CS_1$) by performing hydrolysis/condensation of the reactants and preparing a product including a second colloidal silica ($CS_2$) by simultaneously adding the alkoxysilane and the second basic solution (B2) to the first colloidal silica ($CS_1$) and carrying out a silica growth reaction. The product, namely the first colloidal silica ($CS_1$) or the second colloidal silica ($CS_2$), may include 10-50 weight percent monodisperse silica particles.

The low-concentration first basic aqueous solution (B1) may be an aqueous solution including the basic catalyst at a concentration of 0.01 mM to 50 mM, preferably mM to 10 mM.

The second basic aqueous solution (B2) may be an aqueous solution including the basic catalyst at a concentration of 1.0 mM to 10.0 M, and preferably 1.0 mM to 5.0 M.

If the concentration of the catalyst in the first basic aqueous solution (B1) is too low, the rate of reaction of hydrolysis and condensation and the rate of formation of particles may be lowered.

If the concentration of the catalyst in the second basic aqueous solution (B2) is too high, the rate of reaction of hydrolysis and condensation may increase, and aggregation of the produced silica may occur, making it difficult to obtain high-concentration colloidal silica at high yield.

The basic catalyst that is used may be an organic base compound, such as an amine compound [Chemical Formula 1], quaternary ammonium hydroxide [Chemical Formula 2], quaternary phosphonium hydroxide, etc., or an inorganic base compound, such as an alkali metal hydroxide (LiOH, NaOH, KOH, etc.) or an alkaline earth metal hydroxide [$Ca(OH)_2$, etc.] [Chemical Formula 3]. In particular, an organic base compound catalyst is suitable for preparing a high-concentration colloidal silica solution excluding metal ions, such as in the field of semiconductor materials.

$R_1R_2N—(CH_2)_n—X$ [Chemical Formula 1]

Here, $R_1$ and $R_2$ are the same as or different from each other and each represent hydrogen, a C1-C5 linear hydrocarbon group, or a branched hydrocarbon, n represents an integer of 2 to 10, and X represents OH or —$NHR_3$, in which $R_3$ represents at least one selected from the group consisting of hydrogen, a C1-C3 hydrocarbon group, $CH_2CH_2OH$, and combinations thereof.

$R_4R_5R_6[Y—(CH_2)_n]N^+OH^-$ [Chemical Formula 2]

Here, $R_4$, $R_5$, and $R_6$ are the same as or different from each other and each represent a C1-C5 linear hydrocarbon group or a C3-C5 branched hydrocarbon group, Y represents hydrogen or OH, and n represents an integer of 1 to 5.

$M(OH)_m$ [Chemical Formula 3]

Here, M represents an alkali metal or alkaline earth metal, and m represents 1 or 2. The alkali metal may include lithium (Li), sodium (Na), potassium (K), and the like, and the alkaline earth metal may include calcium (Ca) and the like.

The pH of the low-concentration first basic aqueous solution (B1) falls in the range of 7 to 11. When the first basic aqueous solution (B1) is added with the alkoxysilane, the pH thereof decreases. Therefore, when the alkoxysilane is provided in combination with the second basic solution (B2), the pH of the reactant in the reactor may be maintained in the range of 6 to 11, and a colloidal solution including high-concentration silica particles may be prepared as a product.

In the preparation of colloidal silica, synthesis of silica particles from a colloidal solution of monodisperse silica particles requires a technique for selectively reacting initial silica particle seeds with an alkoxysilane to allow particles to grow to a predetermined shape and size. In the preparation of colloidal silica, a one-step particle growth method or a step-by-step particle growth method may be applied.

Preparing the first colloidal silica ($CS_1$) is a method of preparing high-concentration colloidal silica through hydrolysis and condensation reactions by providing an appropriate amount (desired $SiO_2$ concentration) of the alkoxysilane to the low-concentration first basic aqueous solution (B1). During the reaction, the second basic aqueous solution (B2) serves to maintain the pH within the range of 6 to 11.

Preparing the product including the second colloidal silica ($CS_2$) through secondary silica growth is a method of preparing colloidal silica having a desired particle size (growth) by simultaneously providing the alkoxysilane and the second basic aqueous solution (B2) to the first colloidal silica ($CS_1$), serving as a mother solution. In a similar way, it is also possible to prepare a colloidal silica solution through additional silica growth ($CS_n$: n=$3^{rd}$, $4^{th}$, $5^{th}$, . . . ).

DETAILED DESCRIPTION

Figure 1:
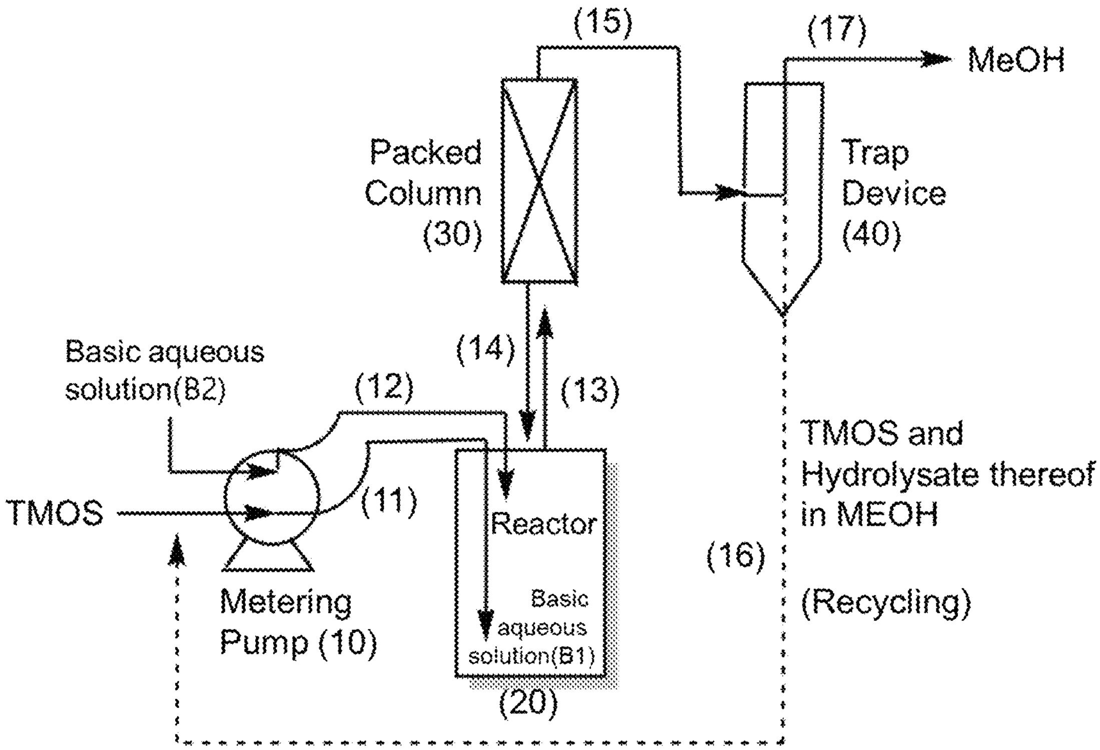
FIG. 1 shows a preparation process according to the present disclosure.

The present disclosure may have various variables with regard to reaction conditions and may take various forms, so embodiments thereof will be described in detail in the text. However, this is not intended to limit the present disclosure to a specific disclosed form, and it should be understood that the present disclosure include all modifications, equivalents, and substitutes falling within the spirit and scope thereof.

Hereinafter, a detailed description will be given of preferred embodiments of the present disclosure with reference to the accompanying drawings.

The terms used in the present application are merely used to describe specific embodiments, and are not construed as limiting the present disclosure. The singular forms are intended to include the plural forms as well, unless the context clearly indicates otherwise. All terms used herein have the same meanings as commonly understood by those of ordinary skill in the art to which the present disclosure belongs. Terms such as those defined in commonly used dictionaries should be construed as being consistent with the contextual meanings in the related art, and should not be construed according to ideal or overly formal meanings unless explicitly defined in the present application.

A method of preparing a first colloidal silica ($CS_1$) according to the present disclosure may include preparing reactants including a low-concentration first basic aqueous solution (B1), a second basic aqueous solution (B2), and an alkoxysilane and obtaining a high-concentration first colloidal silica ($CS_1$) as a product by providing the alkoxysilane alone or in combination with the second basic aqueous solution (B2) to the low-concentration first basic aqueous solution (B1) placed in a reactor. The particle size of monodisperse silica in the first colloidal silica ($CS_1$) is affected by the amount of the alkoxysilane that is initially provided (e.g. for 1 minute) and the total amount of the alkoxysilane that is provided (used). In particular, when the initial amount of the alkoxysilane that is used is large, the particle size becomes small, and when the total amount of the alkoxysilane that is used is large, the particle size increases.

For the size of silica particles, the silica particles may be allowed to grow through several steps as described below.

The preparation of a second colloidal silica ($CS_2$) through secondary silica growth is a method of preparing a second colloidal silica ($CS_2$), which is high-concentration silica resulting from secondary growth, by simultaneously providing the second basic aqueous solution (B2) and the alkoxysilane to the high-concentration first colloidal silica ($CS_1$) in the reactor.

In a similar way, a colloidal solution of silica resulting from additional step-by-step growth, particularly a colloidal solution of silica particles having a size from nanometers to micrometers, such as third colloidal silica ($CS_3$), fourth colloidal silica ($CS_4$), fifth colloidal silica ($CS_5$), and the like, may be prepared.

According to the present disclosure, high-concentration colloidal silica may be prepared. Specifically, as the product, the first or second colloidal silica solution may have a silica content of 10 weight percent to 55 weight percent.

Conventionally, colloidal silica was prepared by the Stober method using both an excess amount of an alcohol solvent and TEOS. If TMOS is used instead of TEOS as a starting material, there is a problem in that gelation occurs under the same conditions. Hence, conventionally, TMOS was added to excess water, and the resulting hydrolysate was used as a starting material (including 7.6 weight percent TMOS). Since silica obtained using such a hydrolysate has a very low concentration of about 2 weight percent to 3 weight percent, a concentration process is required, and a lot of energy is consumed during the concentration process. Moreover, due to the properties of the colloidal particles, a coating layer such as a film may be formed on the inner surface of the reactor during the concentration process, resulting in product loss.

Accordingly, with the goal of solving the above problems, the present disclosure provides a method of preparing high-concentration spherical colloidal silica by directly reacting a basic aqueous solution with an alkoxysilane precursor (unhydrolyzed stock solution), particularly a method of preparing a colloidal solution including high-concentration spherical silica particles by efficiently controlling various reaction conditions, pH, reaction temperature, rate of supply of a starting material, and the like. Here, it is also possible to provide the alkoxysilane stock solution alone to the low-concentration first basic aqueous solution (B1) in the reactor, but providing the alkoxysilane in combination with the second basic solution (B2) makes it possible to control the pH of the reaction mixture, which is advantageous in the preparation of a colloidal solution composed of monodisperse silica particles.

Hereinafter, each step of the method of preparing colloidal silica according to the present disclosure is described in detail.

As shown in the drawing for the preparation process, the preparation apparatus of the present disclosure includes a metering pump 10, a reactor 20, a packed column for separation 30, and a trap device 40 configured to remove an alcohol byproduct and recover an alkoxysilane/hydrolysate thereof.

In the reaction process, the alkoxysilane and the second basic aqueous solution (B2) are provided to the reactor 20 filled with the first basic aqueous solution (B1) at 80-100° C. through a transfer pipe 11 and a transfer pipe 12 connected to the metering pump 10, and allowed to react. Silica particles are obtained through reaction of the alkoxysilane and water in the reactor 20, and an alcohol byproduct that is incidentally generated is discharged in a gaseous phase through a transfer pipe 13. Here, when the alcohol byproduct is discharged from the reactor 20, some of an alkoxysilane and a hydrolysate thereof may be included therein. The alkoxysilane and the hydrolysate thereof are captured in the packed column 30 and recirculated to the reactor 20 through a transfer pipe 14. However, when a large amount of the alcohol byproduct is discharged, a portion thereof may move to the trap device 40 through a transfer pipe 15. In the trap device 40 at 65-80° C., most of the alcohol byproduct may be removed through a transfer pipe 17, and the unreacted alkoxysilane and hydrolysate thereof may be supplied to the reactor 20 through the transfer pipe 16 and may thus be recycled. On the other hand, the unreacted alkoxysilane and hydrolysate thereof received in the trap device 40 may be recycled, but the monodispersity of the silica particles may be affected.

The basic catalyst that is used may be an organic compound such as an amine compound [Chemical Formula 1], quaternary ammonium hydroxide [Chemical Formula 2], quaternary phosphonium hydroxide, etc. or an inorganic compound such as an alkali metal hydroxide (LiOH, NaOH, KOH, etc.) or an alkaline earth metal hydroxide [$Ca(OH)_2$, etc.] [Chemical Formula 3]. In particular, a basic organic compound catalyst is suitable for preparing a high-concentration colloidal silica solution excluding metal ions, such as in the field of semiconductor materials.

$$R_1R_2N—(CH_2)_n—X \quad \text{[Chemical Formula 1]}$$

Here, $R_1$ and $R_2$ are the same as or different from each other, and each represent hydrogen, a C1-C5 linear hydrocarbon group, or a branched hydrocarbon, n represents an integer of 2 to 10, and X represents OH or —$NHR_3$, in which $R_3$ represents at least one selected from the group consisting of hydrogen, a C1-C3 hydrocarbon group, $CH_2CH_2OH$, and combinations thereof. Representative examples of the catalyst represented by Chemical Formula 1 may include 2-aminoethanol, 2-(methylamino)ethanol, 2-(ethylamino)ethanol, 3-aminopropanol, 3-(methylamino)propanol, 4-aminobutanol, 4-(methylamino)butanol, bis(2-hydroxyethyl)amine, tris(2-hydroxyethyl)amine, ethylenediamine, diethylenetriamine, and the like.

$$R_4R_5R_6N[(CH_2)_n—Y]^+OH^- \quad \text{[Chemical Formula 2]}$$

Here, $R_4$, $R_5$, and $R_6$ are the same as or different from each other and each represent a C1-C5 linear hydrocarbon group or a C3-05 branched hydrocarbon group, Y represents hydrogen or OH, and n represents an integer of 1 to 5. Representative examples of the catalyst represented by Chemical Formula 2 may include tetramethylammonium hydroxide, tetraethylammonium hydroxide, (2-hydroxyethyl)trimethylammonium hydroxide (choline hydroxide), and the like.

$$M(OH)_m \quad \text{[Chemical Formula 3]}$$

Here, M represents an alkali metal or alkaline earth metal, and m represents 1 or 2. The alkali metal may include lithium (Li), sodium (Na), potassium (K), and the like, and the alkaline earth metal may include calcium (Ca) and the like.

In particular, a biomass-based basic compound such as 2-aminoethanol, ethylene diamine, 2-hydroxyethyl ethylene diamine, choline hydroxide, etc. used in Examples of this patent not only serves as a catalyst for the preparation of colloidal silica from the alkoxysilane precursor, but also stabilizes the high-concentration silica colloidal solution, and thus has the advantage of showing complex functions and effects. Moreover, a basic catalyst such as 2-aminoethanol, ethylene diamine, 2-hydroxyethyl ethylene diamine, or choline hydroxide functions to increase the particle dispersion stability of the colloidal solution, having a silica content of 30 weight percent or more. Also, these materials enable the development of inexpensive and eco-friendly products.

When the alkoxysilane precursor is supplied to the first basic aqueous solution (B1), the precursor is hydrolyzed to produce silanol (Si—OH), resulting in a lowered pH value. Hence, it is important to simultaneously provide the alkoxysilane precursor and the second basic aqueous solution (B2) thereto to prepare colloidal silica, which is the product, while maintaining the pH thereof in the range of 6 to 11.

The low-concentration first basic aqueous solution (B1) is an aqueous solution including the basic catalyst at a concentration of 0.01 mM to 50 mM, preferably 0.1 mM to 40 mM. If the concentration of the catalyst in the basic aqueous solution (B1) is too low, the rate of reaction of hydrolysis and condensation and the rate of formation of particles are lowered.

The second basic aqueous solution (B2) is an aqueous solution including the catalyst at a concentration of 1.0 mM to 10.0 M, preferably 1.0 mM to 5.0 M. If the concentration of the catalyst in the second basic aqueous solution (B2) is too high, the rate of reaction of hydrolysis and condensation may increase, and aggregation of the produced silica may occur, making it difficult to obtain high-concentration colloidal silica at high yield.

Thereafter, reactants including the low-concentration first basic aqueous solution (B1), the second basic aqueous solution (B2), and the alkoxysilane may be provided.

The low-concentration first basic aqueous solution (B1) in the reactor 20 may be reacted with the alkoxysilane precursor at 80° C. to 100° C., preferably 85° C. to 100° C., more preferably 90° C. to 95° C., to obtain colloidal silica.

As described above, the alkoxysilane precursor is used in the state of an unhydrolyzed stock solution.

The reactants may be provided in a manner in which the low-concentration first basic aqueous solution (B1) is placed in the reactor 20, followed by supplying the alkoxysilane precursor thereto, simultaneously providing the second basic aqueous solution (B2) and the alkoxysilane to the reactor 20, simultaneously providing the second basic aqueous solution (B2) to the upper portion of the reactor 20 and the alkoxysilane to the lower portion thereof, or simultaneously providing the alkoxysilane to the upper portion of the reactor 20 and the second basic aqueous solution (B2) to the lower portion thereof. However, the method of providing the reactants is not limited thereto, and any method commonly used in the technical field to which the present disclosure belongs may be used.

When providing the reactants by supplying the alkoxysilane to the first basic aqueous solution (B1), the alkoxysilane and the second basic aqueous solution (B2) may be simultaneously provided. The amount of the second basic aqueous solution (B2) that is supplied may be selectively determined at a predetermined ratio depending on the amount of the alkoxysilane that is provided. Specifically, the second basic aqueous solution (B2) and the alkoxysilane are supplied to the reactor through a dual pipeline connected to the metering pump 10 and allowed to react, and an alcohol byproduct that is incidentally generated is distilled off (65-80° C.), thereby obtaining 10 weight percent to 55 weight percent of first colloidal silica ($CS_1$).

In the above reaction, the rate of supply of the alkoxysilane affects the monodispersity and yield of spherical silica particles in colloidal silica. When the first basic aqueous solution (B1) in the reactor 20 is added with the alkoxysilane, the pH thereof is lowered, so it is important to provide the second basic aqueous solution (B2) from outside in order to maintain the pH thereof in a predetermined range. The pH of the reactant may fall in the range of 6 to 11, but is preferably maintained in the range of 7 to 11. Meanwhile, when the rate of supply of the alkoxysilane is increased, a large amount of alcohol byproduct is generated, and some of the unreacted alkoxysilane and hydrolysate thereof are discharged together with the byproduct that is vaporized and discharged. Since the unreacted materials, namely the alkoxysilane and the hydrolysate thereof, decrease the yield of silica, recycling thereof makes it possible to increase silica conversion yield.

A product including colloidal silica may be obtained through reaction of the reactants as shown in Scheme 1 below.

$$Si(OR)_4+2H_2O \rightarrow SiO_2+4ROH \quad \text{[Scheme 1]}$$

R=Methyl or Ethyl

Preferably, the reaction is carried out at a pH of 6 to 11 at 85° C. to 100° C. The product may be obtained at a stirring rate of 100 rpm to 400 rpm.

According to the present disclosure, a high-concentration colloidal silica product may be obtained by distilling off an alcohol byproduct that is generated in the reaction process. Briefly, the alkoxysilane need not be subjected to steps such as hydrolysis, concentration, etc. Therefore, the present disclosure is capable of reducing the number of processing steps, shortening the reaction time, and also reducing the reaction space, compared to the conventional process.

In the method of preparing colloidal silica according to the present disclosure, silica particles are produced through the hydrolysis/condensation reaction of the alkoxysilane, and an alcohol byproduct that is incidentally generated is distilled off. After completion of providing of the alkoxysilane in the reaction, the processing time taken to stabilize the growth of silica particles and remove the alcohol may be 1 hour to 12 hours. If the distillation time is less than 1 hour, the alcohol may not be sufficiently removed, whereas if it exceeds 12 hours, the processing time may be excessively prolonged.

A better understanding of the present disclosure may be obtained through the following examples. These examples are merely set forth to illustrate the present disclosure, and are not to be construed as limiting the scope of the present disclosure.

<Preparation of First Colloidal Silica ($CS_1$) Particles>

Example 1

A 2.0 L five-neck baffled reactor was equipped with a heating jacket, the central neck thereof was equipped with a stirring bar [two stainless steel impellers with 4 blade turbines (diameter 50 mm×height 20 mm) installed at the middle and bottom locations], and the remaining four necks thereof were equipped with a thermometer, a reactant supply pipe, a basic catalyst supply pipe, a packed column, and a trap device (filler: stainless steel or Teflon rashing rings).

Figure 2:
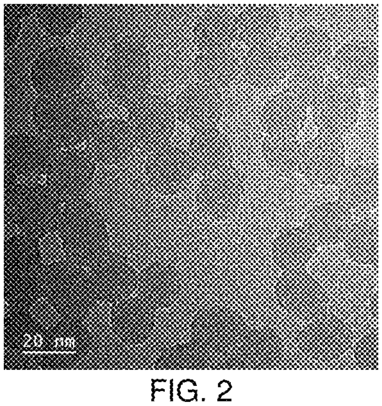
FIG. 2 shows a TEM image of the colloidal silica obtained in Example 1.

1.2 L (0.7 mM) of a low-concentration first basic aqueous solution (B1) including 36.5 mg of 2-aminoethane was placed in the reactor and then heated to 95° C. with stirring at 200 rpm. 640 mL (659.2 g) of TMOS and 32 mL (0.75 M) of a 2-aminoethanol (1.46 g) catalyst aqueous solution (B2) were provided using a metering pump such that TMOS was provided to the lower portion of the reactor and the second basic aqueous solution (B2) was provided to the upper portion of the reactor. TMOS and the second basic aqueous solution (B2) were provided at respective rates of 20.0 mL/min and 1.0 mL/min for an initial 1 minute, and thereafter at respective rates of 3.0 mL/min and 0.15 mL/min for about 3 hours 30 minutes. A methanol byproduct was removed with stirring for an additional 3 hours. During the reaction, the internal temperature of the reactor was maintained at 90-95° C. Here, the internal temperature of the reactor was raised to 100° C. after removal of low-boiling-point methanol, maintained for 5 minutes (during which time a small amount of low-boiling-point material and water were removed together), and then lowered to room temperature. Thereby, 1,303 g of a reaction product (colloidal silica) in the reactor was obtained. Based on the results of analysis, the reaction product was determined to be a colloidal solution (pH 8.23) of 19.9 weight percent silica having a diameter of nm. Also, in the trap device, after removal of the methanol byproduct, unreacted TMOS and hydrolysate thereof (approximately 0.1 weight percent) were almost absent. FIG. 2 shows a TEM image of the colloidal silica obtained in Example 1.

Example 2

In this Example, the reaction was carried out in a similar manner using the same apparatus as in Example 1. 1.0 L (0.7 mM) of a low-concentration first basic aqueous solution (B1) in which 2-aminoethanol (42.8 mg) was dissolved was placed in a reactor and then heated to 95° C. with stirring at 300 rpm. As reactants, 1,100 mL (1,133 g) of TMOS and 55.0 mL (4.0 M) of a 2-aminoethanol (13.4 g) catalyst aqueous solution (B2) were supplied to the reactor at respective rates of 4.0 mL/min and 0.22 mL/min for about 4 hours 10 minutes using a metering pump. Subsequent procedures were performed in the same manner as in Example 1.

Figure 3:
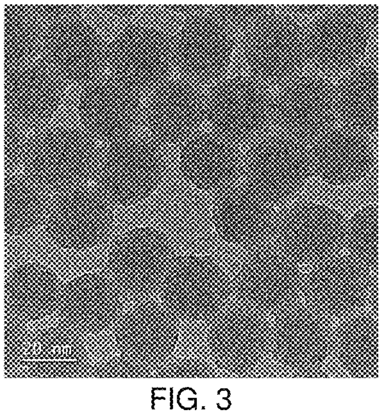
FIG. 3 shows a TEM image of the colloidal silica obtained in Example 2.

Thereby, 1,301 g of a colloidal solution (pH 9.83) of 34.9 weight percent spherical silica having a diameter of 25-28 nm was obtained. FIG. 3 shows a TEM image of the colloidal silica obtained in Example 2.

Example 3 (not Using Basic Aqueous Solution B2)

In this Example, the reaction was carried out in a similar manner using the same apparatus as in Example 1. 1232.8 mL (40 mM) of a low-concentration first basic aqueous solution (B1) in which a 2-aminoethanol (3.0 g, 50 mmol) catalyst was dissolved in distilled water was placed in a reactor and then heated to 95° C. with stirring at 200 rpm. 640 mL (659.2 g) of a reactant TMOS was supplied to the reactor at 20.0 mL/min for an initial 1 minute using a metering pump, and thereafter at 3.0 mL/min for about 3 hours 30 minutes. Subsequent procedures were performed in the same manner as in Example 1.

Figure 4:
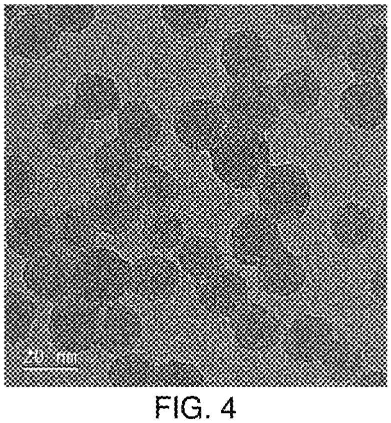
FIG. 4 shows a TEM image of the colloidal silica obtained in Example 3.

Thereby, 1,290 g of a colloidal solution (pH 8.74) of 20.0 weight percent spherical silica having a diameter of 12-19 nm was obtained. FIG. 4 shows a TEM image of the colloidal silica obtained in Example 3.

Example 4

In this Example, the reaction was carried out in a similar manner using the same apparatus as in Example 1.

This reaction was carried out in the same manner using the same apparatus as in Example 1, with the exception that 32 mL (0.375 M) of an aqueous solution (B2) in which a 2-(methylamino)ethanol (0.90 g) catalyst was dissolved was used, instead of the 2-aminoethanol (1.46 g, 24 mmol) catalyst used in Example 1.

Figure 5:
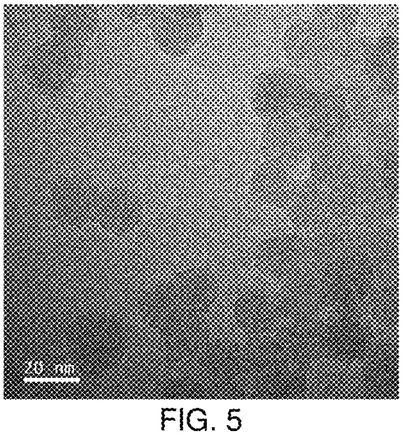
FIG. 5 shows a TEM image of the colloidal silica obtained in Example 4.

Thereby, 1,267 g of a colloidal solution (pH 7.43) of 20.3 weight percent spherical silica having a diameter of 14-18 nm was obtained. FIG. 5 shows a TEM image of the colloidal silica obtained in Example 4.

Example 5

In this Example, the reaction was carried out in the same manner using the same apparatus as in Example 1, with the exception that 32 mL (1.0 M) of an aqueous solution (B2) in which a 2-(dimethylamino)ethanol (2.85 g, 32 mmol) catalyst was dissolved was used instead of the 2-aminoethanol (1.46 g, 24 mmol) catalyst used in Example 1.

Figure 6:
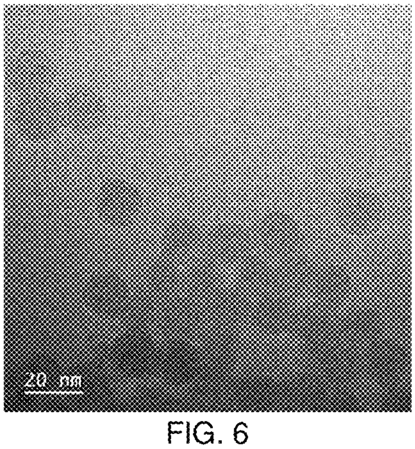
FIG. 6 shows a TEM image of the colloidal silica obtained in Example 5.

Thereby, 1,252 g of a colloidal solution (pH 7.78) of 20.5 weight percent spherical silica having a diameter of 15-17 nm was obtained. FIG. 6 shows a TEM image of the colloidal silica obtained in Example 5.

Example 6

In this Example, the reaction was carried out in a similar manner using the same apparatus as in Example 1, with the exception that 32 mL (0.2 M) of an aqueous solution (B2) in which an ethylenediamine (0.37 g, 6.2 mmol) catalyst was dissolved was used instead of the 2-aminoethanol (1.46 g, 24 mmol) catalyst used in Example 1.

Figure 7:
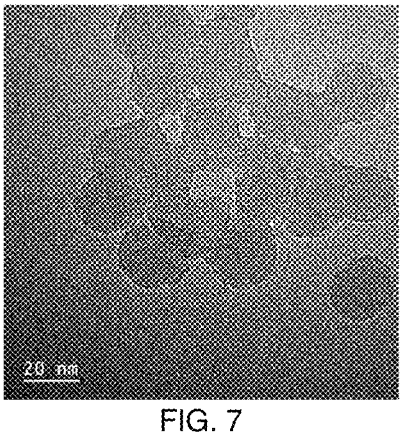
FIG. 7 shows a TEM image of the colloidal silica obtained in Example 6.

Thereby, 1,282 g of a colloidal solution (pH 7.43) of 20.1 weight percent spherical silica having a diameter of 18-22 nm was obtained. FIG. 7 shows a TEM image of the colloidal silica obtained in Example 6.

Example 7

In this Example, the reaction was carried out in a similar manner using the same apparatus as in Example 1, with the exception that a quaternary-ammonium-salt-based choline base (hydroxide) $[[(CH_3)_3N^+(CH_2)_2OH]OH^-]$ catalyst was used instead of the 2-aminoethanol catalyst used in Example 1.

1.5 L (0.7 mM) of a low-concentration basic aqueous solution (B1) prepared by dissolving 0.12 g of the choline base in distilled water was placed in a reactor and then heated to 95° C. As reactants, 810 mL (834.3 g) of TMOS and 40.5 mL (1.0 M) of a choline base (4.9 g) catalyst aqueous solution (B2) were provided to the reactor at respective rates of 4.0 mL/min and 0.2 mL/min through a metering pump. Subsequent procedures were performed in the same manner as in Example 1.

Figure 8:
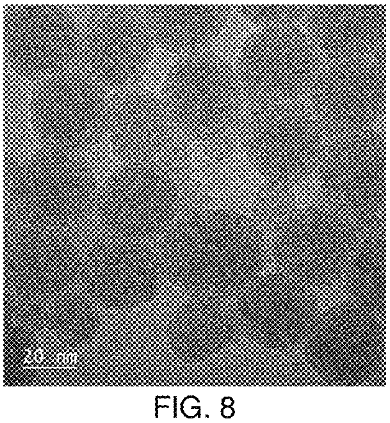
FIG. 8 shows a TEM image of the colloidal silica obtained in Example 7.

Thereby, 1,550 g of a colloidal solution (pH 7.47) of 21.1 weight percent silica having a diameter of 28-32 nm was obtained. FIG. 8 shows a TEM image of the colloidal silica obtained in Example 7.

Example 8

In this Example, TMOS and the basic aqueous solution (B2) were added at respective rates of 12.0 mL/min and 0.6 mL/min, which were increased 3 times, instead of 4.0 mL/min and 0.2 mL/min in Example 7, for 1 minute, using the same apparatus as in Example 1, and then supplied to the reactor at predetermined rates of 4.0 mL/min and 0.2 mL/min. Subsequent procedures were performed in the same manner as in Example 7.

Figure 9:
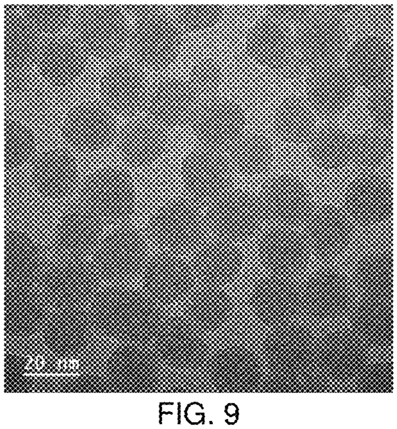
FIG. 9 shows a TEM image of the colloidal silica obtained in Example 8.

Thereby, 1,401 g of a colloidal solution (pH 7.52) of 22.9 weight percent silica having a diameter of 19-21 nm was obtained. FIG. 9 shows a TEM image of the colloidal silica obtained in Example 8.

Example 9

In this Example, TMOS and the basic aqueous solution (B2) were added at respective rates of 24.0 mL/min and 1.2 mL/min, which were increased 6 times, instead of 4.0 mL/min and 0.2 mL/min in Example 7, for 1 minute, using the same apparatus as in Example 1, and subsequent procedures were performed in the same manner as in Example 7.

Figure 10:
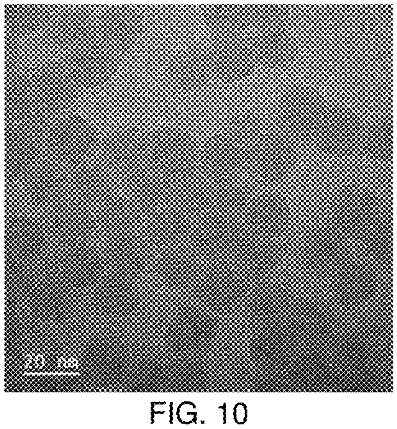
FIG. 10 shows a TEM image of the colloidal silica obtained in Example 9.

Thereby, 1,398 g of a colloidal solution (pH 7.48) of 23.0 weight percent spherical silica having a diameter of 15-18 nm was obtained. FIG. 10 shows a TEM image of the colloidal silica obtained in Example 9.

Example 10

In this Example, the reaction was carried out using the same apparatus as in Example 1 and using the same reactants and amounts as in Example 7.

700 mL (0.7 mM) of a basic aqueous solution B1 prepared by mixing 57 mg of a choline base was placed in a reactor and then heated to 95° C., after which reactants, particularly 810 mL (834.3 g) of TMOS and 810 mL (50 mM) of a choline base (4.9 g) catalyst aqueous solution (B2), were prepared, and each was simultaneously provided to the reactor at a supply rate of 4.0 mL/min using a metering pump. Subsequent procedures were performed in the same manner as in Example 7.

Figure 11:
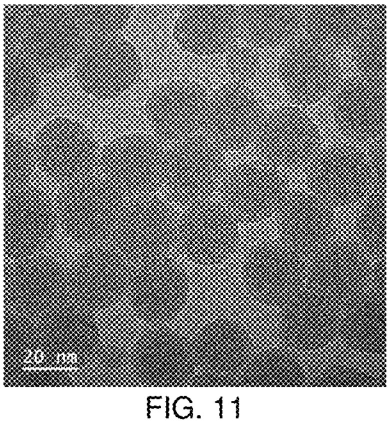
FIG. 11 shows a TEM image of the colloidal silica obtained in Example 10.

Thereby, 1,519 g of a colloidal solution (pH 7.44) of 21.6 weight percent spherical silica having a diameter of 22-25 nm was obtained. FIG. 11 shows a TEM image of the colloidal silica obtained in Example 10.

Example 11

Figure 12:
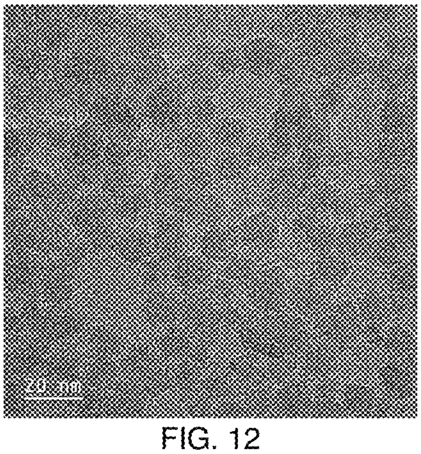
FIG. 12 shows a TEM image of the colloidal silica obtained in Example 11.

90.0 mL (1.42 mM) of a low-concentration basic aqueous solution (B1) prepared by mixing 11.7 mg of a $[(CH_3)_4N^+ OH^-]$ catalyst was placed in a 500 mL reactor and then heated to 95° C., after which reactants, particularly 30.0 mL (30.9 g) of TMOS and 6.0 mL (1.0 M) of a catalyst (0.55 g) aqueous solution (B2), were provided to the reactor at respective rates of 0.8 mL/min and 0.16 mL/min using a metering pump. During the reaction for an additional 1 hour, a methanol byproduct was removed. Here, the internal temperature of the reactor was raised to 100° C. after vaporization and removal of low-boiling-point methanol, maintained for 1 minute (during which time a small amount of low-boiling-point material and water were removed together), and then lowered to room temperature. Thereby, 90.1 g of a colloidal solution (pH 9.00) of 13.3 weight percent silica having a diameter of 12-14 nm was obtained. FIG. 12 shows a TEM image of the colloidal silica obtained in Example 11.

<Growth of Second Colloidal Silica $CS_2$ Particles>

Example 12

For the growth of colloidal silica particles, 200 g of the colloidal solution of 19.9 wt % silica having a diameter of 15-19 nm obtained in Example 1 was placed in a 2 L reactor and then heated to 95° C. with stirring. Thereafter, 687 mL (707.6 g) of TMOS and 1050 mL (2.0 mM) of a 2-aminoethanol (0.13 g) aqueous solution B2 were provided to the reactor at respective rates of 1.0 mL/min and 1.53 mL/min, and subsequent procedures were performed in the same manner as in Example 1.

Figure 13:
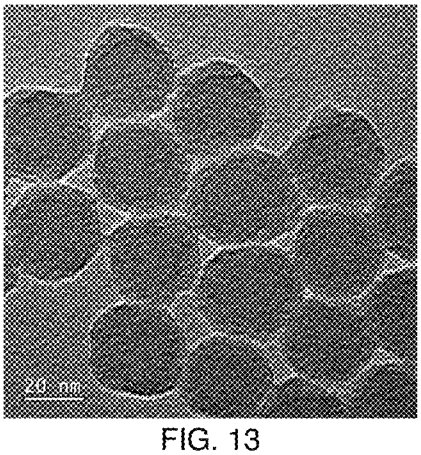
FIG. 13 shows a TEM image of the colloidal silica obtained in Example 12.

Thereby, 1,373 g of a colloidal solution (pH 7.34) of 22.5 weight percent spherical silica having a diameter of 31-33 nm was obtained. FIG. 13 shows a TEM image of the colloidal silica obtained in Example 12.

Example 13

For the growth of colloidal silica particles, 200 g of the colloidal solution of 23.0 weight percent silica having a diameter of 15-18 nm obtained in Example 9 was placed in a 2.0 L reactor and then heated to 95° C. with stirring at 200 rpm. Thereafter, 688.0 mL (708.6 g) of TMOS was provided at a rate of 2.0 mL/min to the upper portion of the reactor, and 1270 mL (40 mM) of a 2-aminoethanol (3.08 g) catalyst aqueous solution (B2) was provided at a rate of 3.7 mL/min to the lower portion of the reactor. After completion of supply of the reactants, subsequent procedures were performed in the same manner as in Example 1.

Figure 14:
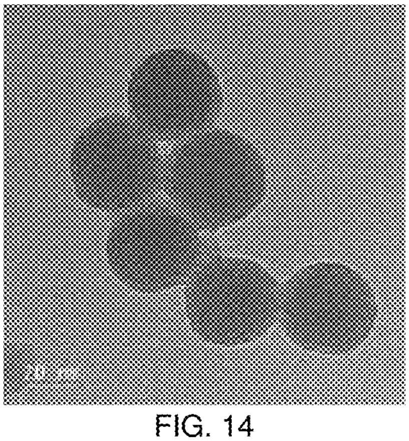
FIG. 14 shows a TEM image of the colloidal silica obtained in Example 13.

Thereby, 1,390 g of a colloidal solution (pH 7.37) of 21.1 weight percent spherical silica having a diameter of 30-32 nm was obtained. FIG. 14 shows a TEM image of the colloidal silica obtained in Example 13.

Example 14

In this Example, the reaction was carried out in the same manner as in Example 13, with the exception that 1270 mL (20 mM) of an aqueous solution (B2) of the 2-aminoethanol (1.54 g, 25.6 mmol) catalyst, the amount of which was halved, instead of the 2-aminoethanol (3.08 g, 51.3 mmol) catalyst in Example 13, was used as the reactant.

Figure 15:
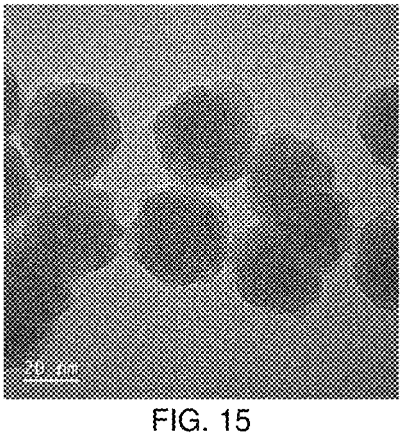
FIG. 15 shows a TEM image of the colloidal silica obtained in Example 14.

Thereby, 1,232 g of a colloidal solution of 26.0 weight percent spherical silica having a diameter of 31-33 nm was obtained. FIG. 15 shows a TEM image of the colloidal silica obtained in Example 14.

Example 15 (Preparation of Silica Particles Through Three-Step Growth Reaction)

For the growth of colloidal silica particles, 200 g of the colloidal solution of silica (26.0 weight percent) having a diameter of 31-33 nm obtained in Example 14 was placed in a 2.0 L reactor and then heated to 95° C. with stirring at 200 rpm. Thereafter, reactants, particularly 688.0 mL (708.6 g) of TMOS and 1200 mL (2.54 mM) of a 2-aminoethanol (0.305 g) catalyst aqueous solution (B2), were provided to the reactor at respective rates of 1.0 mL/min and 1.7 mL/min using a metering pump. After completion of supply of the reactants, subsequent procedures were performed in the same manner as in Example 1.

Figure 16:
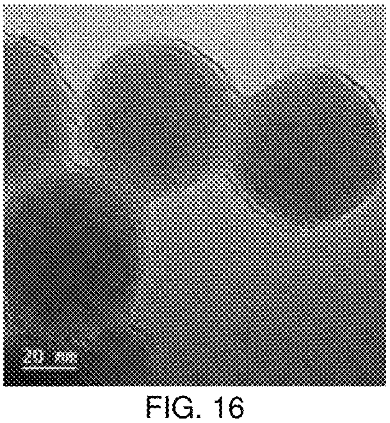
FIG. 16 shows a TEM image of the colloidal silica obtained in Example 15.

Thereby, 1,419 g of a colloidal solution (pH 7.39) of 24.5 weight percent spherical silica having a diameter of 55-58 nm was obtained. FIG. 16 shows a TEM image of the colloidal silica obtained in Example 15.

Example 16 (Two-Step Silica Particle Growth Reaction)

In this Example, the reaction was carried out in a similar manner using the same apparatus as in Example 1.

200 mL (16 mM) of a basic aqueous solution (B1) prepared by mixing a 2-aminoethanol (0.2 g) catalyst was placed in a reactor and then heated to 95° C. with stirring, after which reactants, particularly 80 mL (82.4 g) of TMOS and 4.0 mL (1.0 M) of a 2-aminoethanol (0.49 g) catalyst aqueous solution (B2), were provided to the reactor at respective rates of 1.15 mL/min and 0.057 mL/min using a metering pump. Subsequent procedures were performed in the same manner as in Example 1. Thereby, a colloidal solution (pH 7.34) of spherical silica having a diameter of 12-15 nm was obtained, after which 734 mL (756.0 g) of TMOS and 1270 mL (10.0 mM) of a 2-aminoethanol (1.54 g) catalyst aqueous solution (B2) were provided to the reactor at respective rates of 2.0 mL/min and 3.5 mL/min using the metering pump. After completion of supply of the reactants, subsequent procedures were performed in the same manner as in Example 1.

Figure 17:
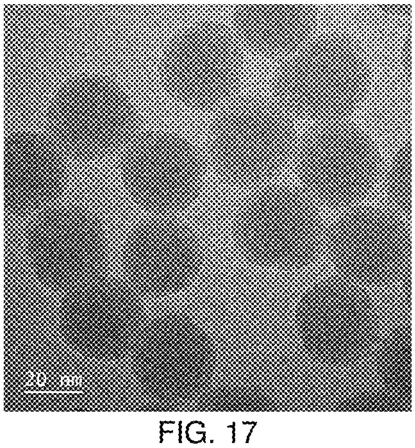
FIG. 17 shows a TEM image of the colloidal silica obtained in Example 16.

Thereby, 1,445 g of a colloidal solution (pH 7.23) of 22.5 weight percent spherical silica having a diameter of 31-35 nm was obtained. FIG. 17 shows a TEM image of the colloidal silica obtained in Example 16.

Example 17 (Use of TEOS (Tetraethyl Orthosilicate) Precursor)

In this Example, the reaction was carried out in a similar manner using the same apparatus as in Example 1.

1.0 L (0.7 mM) of a low-concentration first basic aqueous solution (B1) including a 2-aminoethanol catalyst (43 mg) was placed in a reactor and then heated to 95° C. with stirring. Thereafter, 1,500 mL (1,410 g) of TEOS and 50 mL (4.0 M) of a catalyst (12.2 g, 0.2 mol) aqueous solution were provided to the reactor at respective rates of 30.0 mL/min and 1.0 mL/min for an initial 1 minute using a metering pump, and thereafter at respective rates of 4.0 mL/min and 0.133 mL/min for about 6 hours minutes. Subsequent procedures were performed in the same manner as in Example 1.

Figure 18:
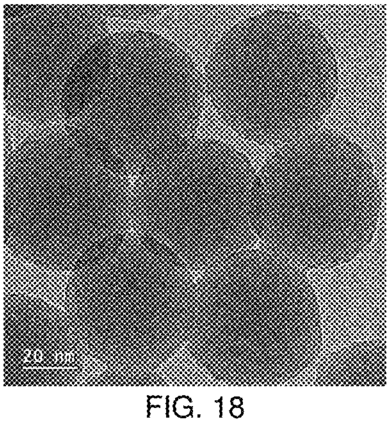
FIG. 18 shows a TEM image of the colloidal silica obtained in Example 17.

Thereby, 876 g of a colloidal solution (pH 10.08) of 46.1 weight percent spherical silica having a diameter of 58-61 nm was obtained. FIG. 18 shows a TEM image of the colloidal silica obtained in Example 17.

Example 18

100.0 mL (0.7 mM) of a low-concentration basic aqueous solution (B1) prepared by dissolving 4.0 mg of a NaOH catalyst was placed in a 500 mL reactor and then heated to 95° C., after which reactants, particularly 54.0 mL (50.8 g) of TEOS and 2.7 mL (1.0 M) of a catalyst (0.11 g) aqueous solution (B2), were supplied to the reactor at respective rates of 1.7 mL/min and 0.08 mL/min for an initial 1 minute using a metering pump, and thereafter at respective rates of 0.8 mL/min and 0.16 mL/min. During the reaction for an additional 2 hours, a methanol byproduct was removed.

Figure 19:
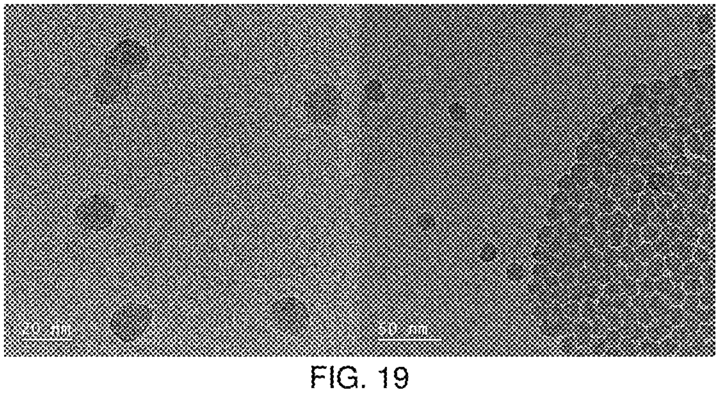
FIG. 19 shows TEM images of the colloidal silica obtained in Example 18.

Thereby, 90.1 g of a colloidal solution (pH 8.26) of 13.3 weight percent silica having a diameter of 13-17 nm was obtained. FIG. 19 shows TEM images of the colloidal silica obtained in Example 18.

As is apparent from the above description, according to the present disclosure, it is possible to provide a method of preparing high-concentration colloidal silica capable of reducing the number of reaction processing steps, shortening the reaction time, and reducing the reaction space.

According to the present disclosure, when an alkoxysilane is provided to an appropriate amount of a basic aqueous solution, hydrolysis and condensation reactions are performed, and an alcohol byproduct that is incidentally generated is distilled off, thereby obtaining high-concentration colloidal silica. Here, distillation and concentration processes necessary for removing excess water in conventional preparation methods, including mixing an alkoxysilane with an excess of distilled water to obtain a hydrolysate, which is then supplied to a basic aqueous solution to produce low-concentration colloidal silica, are obviated by the present disclosure, thus shortening the reaction time and reducing the reaction space, so the process of the present disclosure is very economically efficient.

According to the present disclosure, high-concentration colloidal silica is prepared by reacting an alkoxysilane precursor and water (distilled water) in the presence of a basic catalyst. Therefore, unlike conventional techniques, since an excess of distilled water is not used, it is possible to reduce the space for preparation facilities, shorten the processing time, and decrease the solvent (water) removal cost. Thus, the preparation process according to the present disclosure is very economically efficient in terms of processing costs.

The effects of the present disclosure are not limited to the above-mentioned effects. It should be understood that the effects of the present disclosure include all effects that can be inferred from the description of the present disclosure.

Although the present disclosure has been described in detail above, the scope of the present disclosure is not limited to the foregoing, and various modifications and improvements by those skilled in the art using the basic concept of the present disclosure as defined in the following claims are also included in the scope of the present disclosure.

What is claimed is:

1. A method of producing a colloidal silica, comprising:

preparing a first basic aqueous solution (B1) by dissolving a basic catalyst represented by [Chemical Formula 1], [Chemical Formula 2], or [Chemical Formula 3] below in distilled water;

preparing a second basic aqueous solution (B2) by dissolving a basic catalyst represented by [Chemical Formula 1], [Chemical Formula 2], or [Chemical Formula 3] below in distilled water;

preparing reactants by providing the first basic aqueous solution (B1) into a reactor and then providing to the reactor simultaneously an alkoxysilane and the second basic aqueous solution (B2) to two different portions of the reactor, wherein the alkoxysilane comprises tetramethyl orthosilicate (TMOS) or tetraethyl orthosilicate (TEOS);

preparing a first colloidal silica ($CS_1$) by performing hydrolysis/condensation of the reactants; and preparing a product comprising a second colloidal silica ($CS_2$) by simultaneously adding the second basic aqueous solution (B2) and the alkoxysilane dropwise to the first colloidal silica ($CS_1$):

$R_1R_2N—(CH_2)_n—X$ [Chemical Formula 1]

wherein $R_1$ and $R_2$ are same as or different from each other and each represent hydrogen, a C1-C5 linear hydrocarbon group, or a branched hydrocarbon, n represents an integer of 2 to 10, and X represents OH or $NHR_3$, in which $R_3$ represents at least one selected from the group consisting of hydrogen, a C1-C3 hydrocarbon group, $CH_2CH_2OH$, and combinations thereof;

$R_4R_5R_6N[(CH_2)_n—Y]^+OH^-$ [Chemical Formula 2]

wherein $R_4$, $R_5$, and $R_6$ are same as or different from each other and each represent a C1-C5 linear hydrocarbon group or a C3-C5 branched hydrocarbon group, Y represents hydrogen or OH, and n represents an integer of 1 to 5; and $M(OH)_m$ [Chemical Formula 3]

wherein M represents an alkali metal or alkaline earth metal, and m represents 1 or 2.

2. The method of claim 1, wherein the basic catalyst comprises an amine-based compound represented by [Chemical Formula 1] or a quaternary ammonium salt compound represented by [Chemical Formula 2], so as to exclude metal ions from the colloidal silica.

3. The method of claim 2, wherein the basic catalyst comprises aminoethanol, ethylene diamine, or choline hydroxide, which is a biomass-based compound, and the silica concentration of the colloidal silica is 30 weight percent or more.

4. The method of claim 1, wherein the basic catalyst comprises an alkali metal hydroxide or an alkaline earth metal hydroxide represented by [Chemical Formula 3], which are inorganic compounds.

5. The method of claim 1, wherein the first basic aqueous solution (B1) is a solution comprising the basic catalyst at a concentration of 0.01 mM to 50 mM.

6. The method of claim 1, wherein the second basic aqueous solution (B2) is a solution comprising the basic catalyst at a concentration of 1.0 mM to 10.0 M.

7. The method of claim 1, wherein the alkoxysilane is used in a state of an unhydrolyzed stock solution.

8. The method of claim 1, wherein the alkoxysilane is provided to an upper portion of the reactor and the second basic aqueous solution (B2) is provided to a lower portion of the reactor, or the second basic aqueous solution (B2) is provided to an upper portion of the reactor and the alkoxysilane is provided to a lower portion of the reactor.

9. The method of claim 1, wherein the alkoxysilane is used in an amount of 1.5 to 10.0 mol based on 1.0 L, which is a sum of amounts of the first basic aqueous solution (B1) and the second basic aqueous solution (B2).

10. The method of claim 1, wherein the alkoxysilane is provided at a rate of 0.2 to 2.5 mol/h based on 1.0 L, which is a sum of amounts of the first basic aqueous solution (B1) and the second basic aqueous solution (B2).

11. The method of claim 1, wherein the product is reacted at a pH of 6 to 11.

12. The method of claim 1, wherein a temperature of the hydrolysis/condensation is 80° C. to 100° C.

13. The method of claim 1, wherein a stirring rate during the hydrolysis/condensation is 100 rpm to 400 rpm.

14. The method of claim 1, wherein an amount of a silica particle seed that is produced is controlled by adjusting an amount of the alkoxysilane that is provided within an initial 1 to 5 minutes to the first basic aqueous solution (B1).

15. The method of claim 14, wherein the first colloidal silica ($CS_1$) having a predetermined size is prepared by providing the alkoxysilane and the second basic solution (B2) at a predetermined ratio to the basic solution (B1) comprising the silica particle seed.

16. The method of claim 15, wherein, in the preparing the first colloidal silica ($CS_1$), silica particles are obtained in a diameter ranging from 5 nm to 100 nm.

17. The method of claim 15, wherein a size of silica particles is uniformly increased by providing the alkoxysilane and the second basic solution (B2) at a predetermined ratio to a first colloidal silica ($CS_1$) solution.

18. The method of claim 17, wherein, in the preparing the product, silica particles are obtained in a diameter ranging from 30 nm to 150 nm.

19. The method of claim 18, wherein a particle size of the colloidal silica is increased by repeating processes of simultaneously providing the second basic aqueous solution (B2) and the alkoxysilane at a predetermined ratio to the product and carrying out a reaction.

20. The method of claim 19, wherein a concentration of the second basic aqueous solution (B2) is 0.5 mM to 200.0 mM when silica growth is repeated.

21. The method of claim 1, wherein the method further comprises distilling off an alcohol byproduct that is generated during the hydrolysis/condensation.

22. The method of claim 1, wherein, in the preparing the product, an alcohol byproduct is distilled off with stirring for 1 hour to 12 hours while maintaining a reaction temperature of the product after completion of providing of the alkoxysilane.

23. The method of claim 22, wherein the method further comprises recycling an unreacted alkoxysilane and a hydrolysate thereof, which are discharged together with the alcohol byproduct when distilled off.

24. The method of claim 1, wherein the product comprises 10 weight percent to 55 weight percent of silica particles.

* * * * *